H. W. CONNER.
CAMERA.
APPLICATION FILED MAY 29, 1909.

941,696.

Patented Nov. 30, 1909.

3 SHEETS—SHEET 1.

Witnesses.

Inventor.
H. W. Conner

H. W. CONNER.
CAMERA.
APPLICATION FILED MAY 29, 1909.

941,696.

Patented Nov. 30, 1909.
3 SHEETS—SHEET 3.

Witnesses.
F R Roulstone
E Batchelder

Inventor.
H. W. Conner
by Hughs Brown Quinby May
Attys.

UNITED STATES PATENT OFFICE.

HARRISON W. CONNER, OF BOSTON, MASSACHUSETTS, ASSIGNOR, BY MESNE ASSIGNMENTS, TO SUSAN GERTRUDE CONNER, OF READING, MASSACHUSETTS.

CAMERA.

941,696.   Specification of Letters Patent.   Patented Nov. 30, 1909.

Application filed May 29, 1909. Serial No. 499,159.

*To all whom it may concern:*

Be it known that I, HARRISON W. CONNER, of Boston, in the county of Suffolk and State of Massachusetts, have invented certain new and useful Improvements in Cameras, of which the following is a specification.

This invention relates to a photograph camera having means for storing and feeding a sensitive film, portions of which are successively exposed behind the lens.

The invention has for its object to provide improved means for indicating whether the film has been moved forward after an exposure to present a new part of the film in position for the next exposure, and thus reduce to the minimum the liability of a double exposure due to carelessness or forgetfulness of the operator.

The invention consists in the improvements which I will now proceed to describe and claim.

Figure 1:
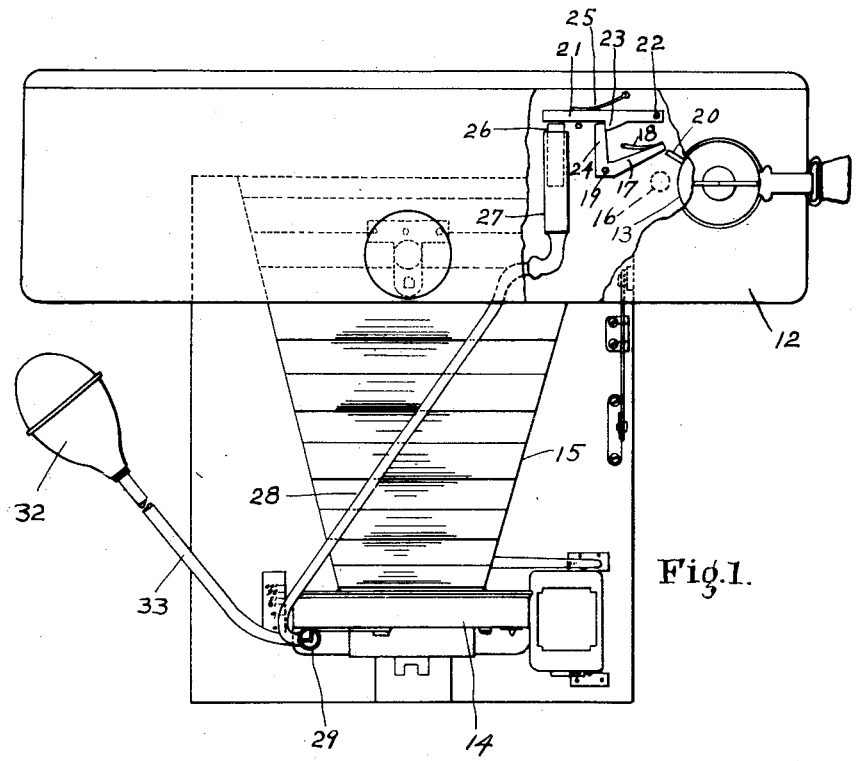
Figure 3:
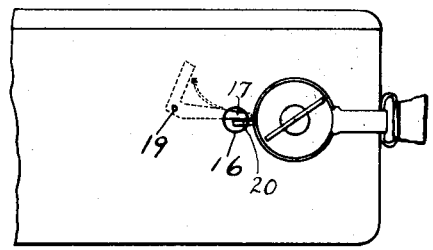
Figure 2:
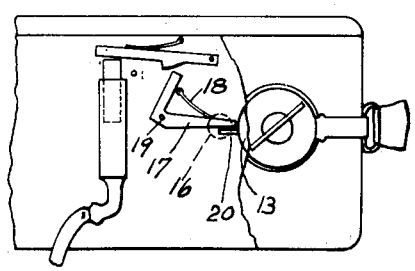
Figure 4:
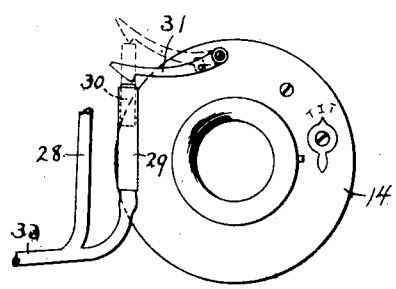
Figure 5:
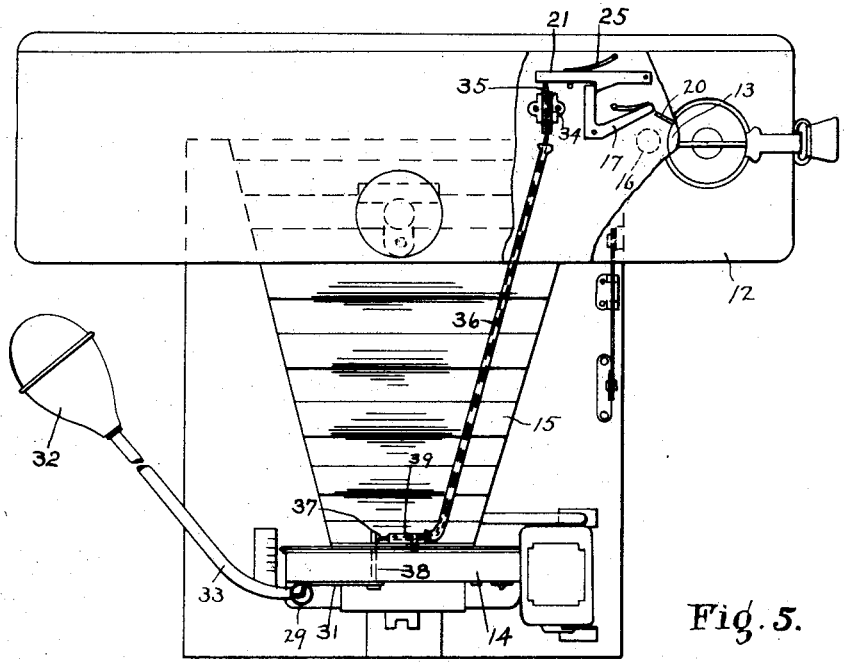
Figure 7:
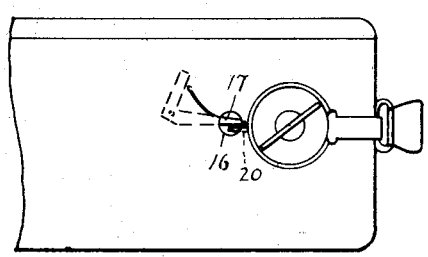
Figure 6:
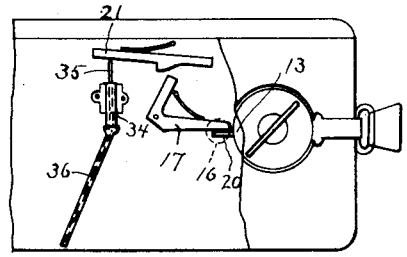
Figure 8:
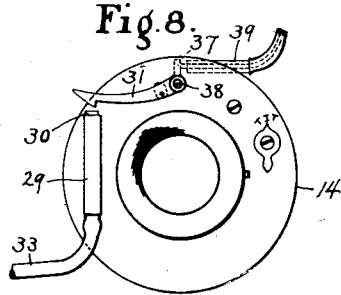

Of the accompanying drawings, forming a part of this specification,—Figure 1 represents a top plan view of a folding camera, provided with indicating mechanism embodying my invention, the camera being extended and a portion of the film-storing part of the case being broken away, the indicator being shown in its concealed position. Fig. 2 represents a view similar to a portion of Fig. 1, showing the indicator in its exposed position. Fig. 3 represents a view similar to a portion of Fig. 2, showing the sight opening through which the indicator is viewed. Fig. 4 represents a side view of the lens and shutter holder, and parts of the tubing shown in Fig. 1. Fig. 5 represents a view similar to Fig. 1, showing a modification. Figs. 6, 7, and 8 represent views similar to Figs. 2, 3, and 4, and illustrating the modified construction shown in Fig. 5. Figs 9, 10, 11, and 12 represent views of another modification.

The same reference characters indicate the same parts in all the figures.

My invention as shown in Figs. 1 and 5, is embodied in an extension camera, the case of which has the usual portion 12 which contains the film winding spool 13, the lens and shutter-holding portion 14, and the intermediate flexible portion 15, which constitutes a connection between the portions 12 and 14, the construction above described being common and constituting no part of my invention.

The portion 12 of the case is provided with a sight opening 16 which, as here shown, is adjacent to one of the bearings in which the spool 13 is journaled.

17 represents an indicator which is movably connected with the portion 12 of the case, and is normally held by a spring 18 in an exposed position, a portion of the indicator extending across the opening 16, and being visible therethrough. The indicator is pivoted at 19 to the case, and is movable to a concealed position at one side of the opening 16, as shown in Fig. 1, the indicator being moved to its concealed position by the operation of the film-feeding mechanism, and preferably by a pin 20 projecting from the winding spool 13, the relative arrangement of the indicator and pin being such that when the pin is moved from the position shown in Fig. 2, to that shown in Fig. 1, it will move the indicator from its exposed position to its concealed position. Means are provided for automatically locking the indicator in its concealed position, the preferred means being a detent arm 21 pivoted at 22 to the case and provided with a tooth 23 adapted to engage an arm 24 on the indicator and hold the latter in its concealed position, the detent arm being yieldingly held by a spring 25 in engagement with the indicator arm 24. Means are provided for automatically tripping the detent and releasing the indicator when the lens shutter is operated to expose the film. To this end, a tripping device or member 26 is provided which bears against the detent arm 21, and is adapted to be moved simultaneously with the shutter to displace the detent and permit the indicator to be moved by its spring to its exposed position, as indicated in Figs. 2 and 3.

In the embodiment of my invention shown in Figs. 1, 2, and 3, the tripping member 26 is a plunger which is movable by air pressure in a cylinder 27 affixed to the case of the camera. Said cylinder is connected by a flexible air tube 28 with a cylinder 29 affixed to the portion 14 of the case. The cylinder 29 is provided with the usual piston 30 which coöperates as usual with a lever 31 having suitable connections with the shutter, the arrangement being such that when the piston 30 is projected, it moves the lever 31 to the position shown by dotted lines in Fig. 4, and thus operates the shutter. A compressible bulb 32 is provided, which is connected by an air tube 33 with the cylinder 29. The described shutter operating mechanism is of well known construction, the only novel feature illustrated in Fig. 4 being the air tube 28 which conducts air pressure by the compression of the bulb 32 to the cylinder 27 for the purpose of operating the tripping member 26.

In feeding the film the spool 13 is rotated in the direction required to move the pin 20 against the indicator 17 when the parts are in the position shown in Fig. 2. Assuming that the film has been adjusted for an exposure and the bulb 32 has been compressed to operate the shutter, this operation will force air through the tube 28 and project the piston 26, thus causing it to trip the detent 21 and permit the indicator 17 to assume its normal exposed position under the influence of the spring 18. The indicator is now in the path of the pin 20, and remains there until the spool 13 is rotated to expose a fresh portion of the film. The rotation of the spool causes the pin 20 to move the indicator back to its concealed position, the indicator being locked in this position by the detent which has at this time been moved back to its operative position by its spring 25. It will be seen therefore that the operator can by inspecting the sight opening 16, readily determine whether the film has been moved since the last exposure or not, the indicator showing through the sight opening if the film has not been moved, and being invisible if the film has been moved.

In Figs. 5, 6, 7, and 8, I show a modification in which a length of flexible wire 35 inclosed for the greater part of its length in a flexible rubber tube 36, is interposed between the detent 21 and an arm 37 secured to a rock-shaft 38 to which the lever 31 is attached. Said rock-shaft extends through the portion 14 of the case and is rocked by the movements of the lever 31 caused by the compression of the bulb 32 and the usual spring mechanism, not shown, inclosed in the case and normally holding the lever 31 in the position shown by full lines in Fig. 8. The end portions of the wire 35 are movable in fixed guides 39 and 40. When the lever 31 is raised by the projection of the piston 30, the arm 37 forces the wire 35 endwise, and causes it to transmit pressure to the detent arm 21. When the air pressure on the piston 30 ceases, the lever 31 returns to its normal position and allows the detent spring 25 to force the detent to its operative position, and at the same time move the wire 35 backwardly against the arm 37.

Figure 10:
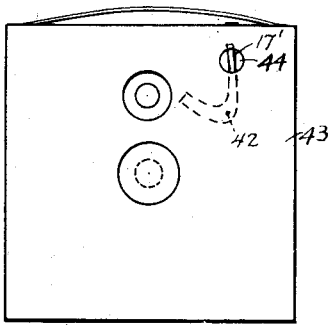
Figure 9:
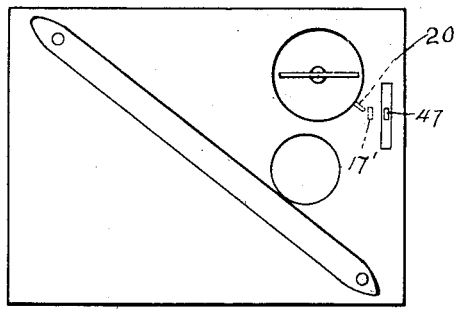
Figure 12:
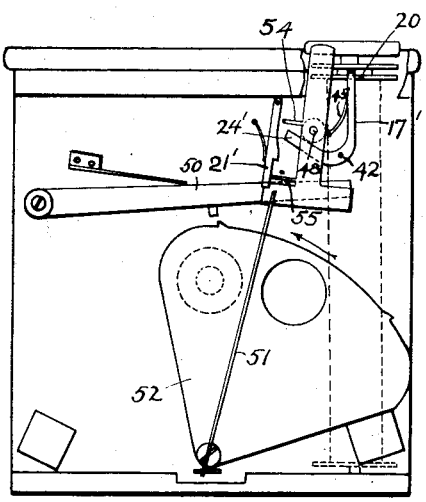
Figure 11:
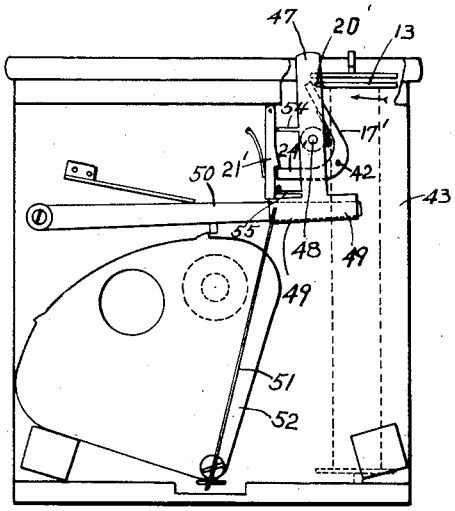

In the embodiments of my invention shown in Figs. 9, 10, 11 and 12, 17' represents an indicator which is pivoted at 42 to the case 43 of a non-extensible camera, said case having a sight opening 44 through which a portion of the indicator is visible when the indicator is held by the spring 45 in its normally exposed position as indicated in Figs. 10 and 12. The indicator has an arm 24' adapted to be engaged by the detent arm 21' which locks the indicator in its concealed position. The indicator projects into the path of a pin 20' on the film winding spool 13, and is adapted to be moved by said pin from its exposed to its concealed position when the spool is being rotated to feed the film. The detent in this embodiment of the invention is displaced to release the indicator by the oscillatory lever 47 which is pivoted at 48 and is provided with arms 49 engaging the lower edge of a detent arm 50. One of the lever arms 49 is connected with one end of a spring 51, the other end of which is so connected with a shutter 52 that, when the lever 47 is oscillated in one direction, the spring will be put under tension tending to throw the shutter in one direction, the lever 50 being at the same time moved to release the shutter by one of the arms 49. When the lever 47 is moved in the opposite direction, the spring is oppositely flexed and the shutter is again thrown but in a direction opposite to the first described movement. The shutter and its operating mechanism, shown in Figs. 11 and 12, are well known and do not require further description, it being sufficient to state that the lever 47 is provided with projections 54 and 55 located at opposite sides of its pivot 48, the arrangement being such that each movement of the lever will cause one of said projections to act as a tripping member displacing the detent 21' and releasing the indicator 17'.

It will be seen that in each of the above-described embodiments of my invention, the indicator is normally held in its exposed position by a spring and is displaced to a concealed position by the operation of the film-feeding mechanism, and is locked in its concealed position until the shutter is operated, the shutter-operating mechanism causing the release of the indicator and permitting its return to its exposed position. The indicator is therefore normally held with certainty and exactness in its exposed position without liability of being accidentally displaced therefrom, and the locking detent is adapted to be operated either directly by a part of the shutter-operating mechanism as shown in Figs. 11 and 12 in a non-extensible camera, or by intermediate flexible means, between the mechanism acting directly on the shutter and the said detent, in an extension camera, as shown in Figs. 1 and 5.

I do not limit myself to the details of the mechanism here shown and described, as the same may be variously modified without departing from the spirit of the invention.

I claim:

1. A camera, comprising a case, a film-feeding spool journaled therein, the case being provided with a sight opening adjacent to the spool, a movable indicator within the case normally held in a projected position and visible through the sight opening, means operated by the rotation of the spool for retracting the indicator to a concealed position, a detent within the case adapted to automatically engage said indicator and hold it in its retracted position, a shutter, and means for simultaneously operating the shutter to expose the film, and tripping said detent to release the indicator and permit its return to its exposed position.

2. A camera, comprising a case, a film-feeding spool journaled therein, the case being provided with a sight opening adjacent to the spool, a movable indicator within the case normally held in a projected position and visible through the sight opening, means operated by the rotation of the spool for retracting the indicator to a concealed position, a detent within the case adapted to automatically engage said indicator and hold it in its retracted position, a tripping device engaged with the detent, a shutter, and shutter-operating means having provisions for simultaneously operating the shutter and the tripping device, to cause the exposure of the film and the return of the indicator to its exposed position.

3. In a camera comprising an extensible case a part of which contains the film-holding and feeding mechanism, and another part the lens and the shutter, one of said parts being movable relatively to the other, a movable indicator within the film-containing portion of the case, and normally held in a projected position and visible through a sight opening in said portion, means operated by the adjustment of the film for retracting the indicator to a concealed position, a detent within the film-containing portion of the case adapted to automatically engage said indicator and hold it in its retracted position, a tripping member engaged with said detent, a shutter, shutter-operating means carried by the lens-containing portion of the case, and flexible means for communicating motion from the shutter-operating means to the tripping member.

4. In a camera comprising an extensible case a part of which contains the film-holding and feeding mechanism, and another part the lens and the shutter, one of said parts being movable relatively to the other, a movable indicator within the film-containing portion of the case, and normally held in a projected position and visible through a sight opening in said portion, means operated by the adjustment of the film for retracting the indicator to a concealed position, a detent within the film-containing portion of the case adapted to automatically engage said indicator and hold it in its retracted position, a tripping member engaged with said detent and formed as a piston, a cylinder in which said piston is movable, pneumatically controlled shutter-operating means carried by the lens-containing portion of the case, and a flexible tube extending from the shutter-operating means to the said cylinder.

5. A camera comprising a case having a sight opening, a film-feeding spool journaled in the case, a movable spring-pressed indicator normally held by its spring in a projected position and visible through said opening, means operated by the rotation of the spool for retracting the indicator to a concealed position, means for locking the indicator in its concealed position, a shutter, mechanism for actuating the same, and means operated by the shutter-actuating mechanism for releasing or unlocking the indicator and permitting its return to its exposed position.

In testimony whereof I have affixed my signature, in presence of two witnesses.

HARRISON W. CONNER.

Witnesses:
C. F. BROWN,
P. W. PEZZETTI.

It is hereby certified that in Letters Patent No. 941,696, granted November 30, 1909, upon the application of Harrison W. Conner, of Boston, Massachusetts, for an improvement in "Cameras," an error appears requiring correction as follows: In the grant and heading of the printed specification the residence of the assignee is written and printed "Reading, Massachusetts," whereas it should have been written and printed *Brookline, Massachusetts*, as shown by the record of assignments in this office; and that the said Letters Patent should be read with this correction therein that the same may conform to the record of the case in the Patent Office.

Signed and sealed this 28th day of December, A. D., 1909.

[SEAL.]

E. B. MOORE,
*Commissioner of Patents.*